United States Patent [19]
Foster

[11] Patent Number: 5,883,511
[45] Date of Patent: Mar. 16, 1999

[54] SENSOR WIRE LEAD STRAIN RELIEF

[75] Inventor: David Alden Foster, Castalia, Ohio

[73] Assignee: General Motors Corporation, Detroit, Mich.

[21] Appl. No.: 824,986

[22] Filed: Mar. 27, 1997

[51] Int. Cl.$^6$ .............................. G01P 3/488; G01P 1/00; H01F 27/29; H01R 13/58
[52] U.S. Cl. .......................... 324/174; 336/192; 439/456; 439/942
[58] Field of Search ...................................... 324/173, 174, 324/207.25; 180/181 R; 303/138; 336/192, 198; 439/449, 450, 456–459, 942; 384/448

[56] References Cited

U.S. PATENT DOCUMENTS

| | | | |
|---|---|---|---|
| 1,039,670 | 9/1912 | Gagnon | 439/450 |
| 2,240,394 | 4/1941 | Eaton | 439/458 |
| 2,283,544 | 5/1942 | Eaton | 439/458 |
| 2,313,426 | 3/1943 | Forstrom | 439/458 |
| 4,394,637 | 7/1983 | Petroons | 336/192 |
| 4,546,340 | 10/1985 | Kuchuris | 336/192 |
| 4,988,220 | 1/1991 | Christiansen et al. | 384/448 |
| 5,385,411 | 1/1995 | Shirai et al. | 324/174 X |

FOREIGN PATENT DOCUMENTS

| | | | |
|---|---|---|---|
| 29185 | 10/1931 | Australia | 439/456 |

*Primary Examiner*—Gerard Strecker
*Attorney, Agent, or Firm*—Jeffrey A. Sedlar

[57] ABSTRACT

A wire lead strain relief mechanism includes a housing having a first wall and a second wall located in substantially parallel and spaced apart positions. The first wall carries a pair of spaced apart terminals and the second wall includes a generally flat surface with a pair of posts including a first post and a fifth post that are spaced apart a distance further than the terminals are spaced apart. The generally flat surface also has a set of three posts including a second post, a third post, and a fourth post all three positioned substantially in line with the first and fifth posts and substantially centered between the first and fifth posts. A wound coil is carried in the housing between the first and second walls and has a pair of terminal ends each engaging one of the terminals. A first wire lead has an insulating covering and is connected to the first terminal and extends from the first terminal around the first post and then in-between the second and the third posts so that the insulating covering is compressed and loads on the wire lead are attenuated at the first, second and third posts so that the first terminal is relieved from stresses. A second wire lead has an insulating covering and is connected to the second terminal and extends from the second terminal around the fifth post and then in-between the third and the fourth posts so that the insulating covering is compressed and loads on the wire lead are attenuated at the fifth, third and fourth posts so that the second terminal is relieved from stresses.

7 Claims, 2 Drawing Sheets

SENSOR WIRE LEAD STRAIN RELIEF

TECHNICAL FIELD

The present invention relates to a wire lead strain relief mechanism and more particularly, to strain relief in wire leads leading to vehicle wheel speed sensor assemblies having associating rotating exciter ring and fixed sensor components including a wound coil.

BACKGROUND OF THE INVENTION

Sensors, including those of the variable reluctance type, are used in a variety of speed and position sensing applications. Variable reluctance sensors are electromagnetic devices that produce an output voltage due to a time varying change in flux flowing through the sensor's coil. This provides a means of measuring translational or rotational motion.

Wheel speed sensing devices such as those used in combination with vehicle anti-lock braking and traction control systems are known wherein a sensor provides a magnetic field through some type of magnet that is generally combined in proximity with a sensing coil into a single sensor component. The coil-magnet component (sensor), is generally mounted in a fixed position relative to the vehicle since it includes signal wires for communication with an electronic control means. Varying flux is caused by a rotating exciter ring that is positioned near the sensor. The exciter ring is generally made of iron and includes a toothed configuration. It is known to mount an exciter ring to turn in rotation at the angular speed of the wheel within the sensor's magnetic field, to create an electric signal that varies with the speed of the wheel. As the exciter ring rotates, the position between the ring teeth and the sensor poles varies between a position when a point on the sensor is aligned with a tooth, and a position when the point is aligned with a slot. The relative position changes, cause variations in the magnitude of the flux path passing through the coil. An output voltage is generated in the coil that is proportional to the rate of change of the flux and the frequency is representative of the rotational speed of the associated vehicle wheel.

Commonly used anti-lock braking and traction control systems employ wheel speed data in evaluating vehicle operating conditions for determining when to enable certain braking pressure altering events. To communicate the data from the wheel speed sensor located at the wheel to the remote braking system controller, electrical conductors are required. The sensor generally has a pair of wire leads that extend from the coil and connect to the vehicle's wiring harness. This connection allows the communication of sensor detected information to the appropriate system controller.

Speed sensors are generally applied to drive wheels such as the front wheels of a front wheel drive vehicle. Often, an annular sensor is used that allows the penetration of a vehicle drive shaft into the wheel bearing system through the sensor. Due to the tight packaging requirements and the close proximity of rapidly moving structures, the exit location of the electrical leads becomes critical. Care must be taken to assure proper clearance between the leads and the neighboring components in the vehicle corner assembly. In spite of the care taken to properly place the wire leads, the relative movement between the wheel assembly and the wiring system will subject the leads to outside forces that act on the connecting points. Accordingly, a sufficiently robust wire connection means is required.

SUMMARY OF THE INVENTION

It has been found that providing a secure connection between the wire leads and the coil of a wheel speed sensor is important, but is not independently sufficient to ensure a robust coil connection. Just as importantly, the wire that makes up the coil windings must also be protected. This is particularly difficult since the winding wire is quite thin and is therefore, relatively fragile. Accordingly, an aspect of the present invention resides in providing stress relief at the wire lead-to-coil connection interface that advantageously protects the coil winding wire from stresses. This objective is complicated since the wire leads, which are subjected to loads and are relative strong, must be electrically connected with the wire winding, which is relatively weak. According to this aspect, a wire lead strain relief mechanism includes a housing that has a generally flat surface with at least three posts including a first post spaced away from a second post and a third post wherein the second and third posts are relatively close together, with all three posts positioned substantially in a line. A terminal is spaced away from the line of posts at a point in between the first and the second posts. An insulated wire lead is connected to the terminal and extends from the terminal around the first post and then passes in-between the second and the third posts. The insulation is compressed between the second and third posts and loads on the wire lead are attenuated at the first, second and third posts so that the terminal is relieved from stresses.

A wire lead strain relief mechanism for application with a wound coil preferably includes a housing with a first wall and a second wall located in substantially parallel and spaced apart positions. The first wall carries at least one terminal and the second wall includes a generally flat surface with at least three posts including a first post spaced away from a second post and a third post. The second and third posts are relatively close together, and all three posts are positioned substantially in line. A wound coil is carried in the housing between the first and second walls and has an end engaging the terminal. A wire lead with an insulating covering that is stripped at an end connected to the terminal, extends from the terminal around the first post and then in-between the second and the third posts. The insulating covering is compressed between the second and third posts so that loads on the wire lead are attenuated at the first, second and third posts, relieving the terminal from stresses.

According to a preferred embodiment of the present invention described in greater detail herein, a wire lead strain relief mechanism for a coil of a wheel speed sensor includes a rotatable ring having a perimeter with alternating teeth and grooves. A magnet and a coil are positioned generally radially around the rotatable ring in a nonrotatable position and near each other so that rotation of the ring near the magnet results in varying magnetic flux at the coil. A housing has a first wall and a second wall located in substantially parallel and spaced apart positions. The first wall carries a pair of spaced apart terminals and the second wall includes a generally flat surface with a pair of posts including a first post and a fifth post that are spaced apart a distance further than the terminals are spaced apart. The generally flat surface also has a set of three posts including a second post, a third post, and a fourth post, all three positioned substantially in line with the first and fifth posts and substantially centered between the first and fifth posts. The coil is carried in the housing between the first and second walls and has a pair of terminal ends each engaging one of the terminals. A seal case is positioned over the rotatable ring, the magnet and the coil, in a nonrotatable position.

With this preferred embodiment, a first wire lead has an insulating covering that is stripped at an end that is connected to the first terminal, and extends from the first terminal around the first post and then in-between the second and the third posts, and through an opening in the seal case. The insulating layer is compressed between the second and the third posts so that loads placed on the first wire lead are attenuated at the first, second and third posts, relieving the first terminal from stresses.

Also in this preferred embodiment, a second wire lead has an insulating covering that is stripped at an end that is connected to the second terminal, and the second wire lead extends from the second terminal around the fifth post and then in-between the third and the fourth posts, and through the opening in the seal case. The insulating layer is compressed between the fourth and the fifth posts so that loads placed on the second wire lead are attenuated at the fifth, third and fourth posts relieving the second terminal from stresses.

According to a preferred aspect of the present invention, the first and second wire leads, of the preferred embodiment described above, extend around the first and fifth posts respectively, so that the first and second wire leads are each bent to at least a 180 degree angle. Additionally, the second and third posts and the third and fourth posts are spaced apart a distance that is equal to no more than 70 percent of a distance measured across the diameter of the insulating covering on the first and second wire leads. This provides stress relief at the wire lead-to-coil connection interface that advantageously protects the coil winding wire and the terminal connections.

DETAILED DESCRIPTION OF THE PRESENTLY PREFERRED EMBODIMENT

Figure 1:
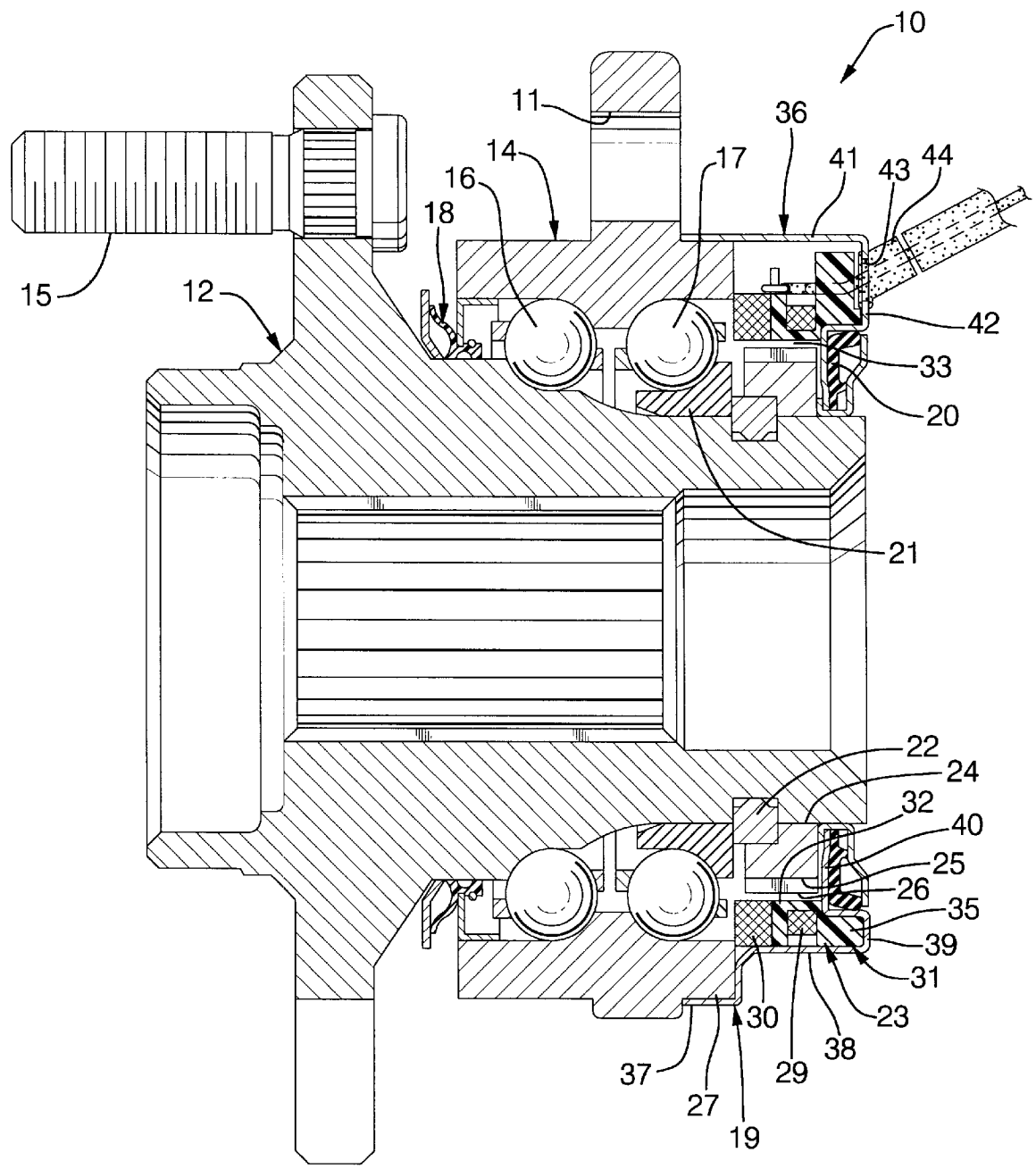
FIG. 1 is a cross sectional view of a vehicle wheel hub and bearing assembly illustrating an embodiment of the present invention.

Referring to FIG. 1, a vehicle wheel hub and bearing assembly is illustrated, and is designated in the aggregate at 10. In general, the wheel hub and bearing assembly 10 is designed as the front assembly of a front wheel drive vehicle equipped with anti-lock braking capabilities. However, the present invention is not limited to such applications, and may find use in a wide variety of devices with a wire lead termination point that lies in an environment where it is routinely subject to vibration and/or movement.

Hub and bearing assembly 10 includes a rotationally fixed outer race 14 and a rotatable inner race 12. Outer race 14 is adapted in a manner well known in the art to be mounted to the steering knuckle (not illustrated), of the associated vehicle through a series of mount holes, representative of which is mounting hole 11. The inner race 12 is also adapted, as is well known, for mounting to an associated wheel (not illustrated), through a series of wheel studs, represented by wheel stud 15, and for receiving a drive shaft (not illustrated), through a central splined connection. The races 12 and 14 are coaxially spaced by dual ball bearing sets 16 and 17. The inner race 12 is supplemented by a separable race 21 for assembly purposes, that is maintained in position by a circular keeper 22 fixed in a groove in the inner race 12.

The outboard (wheel), side of the space between the inner race 12 and the outer race 14 is sealed by a seal assembly 18, and the inboard (vehicle body), side is sealed by a seal case 19 and its associated seal 20 for containing a supply of lubricant (not illustrated), and for providing a protected environment. The seal case 19 is fixed on the outer race 14 at annular shoulder 27 and is therefore, rotationally static. With the outer race 14 fixed against rotation, the inner race 12 rotates relative thereto on the ball bearing sets 16 and 17 at wheel speed. This relative rotational relationship presents an opportunity for sensing the wheel's rotational speed within the protected environment provided for the operative elements of the bearings.

To take advantage of this advantageously presented environment, the present invention includes a variable reluctance sensor assembly 23 that is positioned within the seal case 19. Sensor assembly 23 includes a variable reluctance ring 24 that is made of a material with good magnetic permeability such as iron or steel. Variable reluctance ring 24 is generally annular in shape and positioned over the inner race 12 for concerted rotation therewith, and includes an inner annular groove that fits over the keeper 22. A plurality of equally spaced and alternating grooves 25 and teeth 26 are machined in the variable reluctance ring 24 and are oriented in the axial direction. The grooves 25 and teeth 26 present themselves in an outwardly facing direction around the outer perimeter of the variable reluctance ring 24 within the non-rotating seal case 19.

In combination, a coil 29 and magnet 30 are arranged in positions adjacent one another in a housing 31 that is carried in the seal case 19. The coil 29 and magnet 30 are spaced away from the variable reluctance ring 24 by an air gap 33. Coil 29 comprises a plurality of turns of wire wound together and terminated at each end. The magnet 30 is a permanent multi-pole type that continuously establishes a variable magnetic field in its vicinity. The housing 31 is preferably molded plastic and is generally annular in shape. Housing 31 includes a U-shaped wall 32 that separates the magnet 30 from the coil 29, and surrounds all but the radial outside of the coil 29. Accordingly, the U-shaped wall 32 acts as a bobbin for winding the coil 29. An axially directed substantially annular extension 35 is integrally formed with U-shaped wall 32 and is captured in a pocket of seal case 19.

With specificity, the seal case 19 is substantially annular in shape, with the exception of the upper region 36, which is enlarged for termination of the coil 29. The substantially annular portion includes an axially directed terminal wall 37 that is received over the annular shoulder 27 of outer race 14. Inboard from the terminal wall 37, the seal case 19 is bent radially inward and extends to another axially extending wall 38. The axially extending wall 38 receives the magnet 30 so that it is supported around its outer perimeter, and also receives the housing 31 and coil 29. Further inboard, the seal case 19 takes a U-shaped bend 39 that surrounds the annular extension 35 of housing 31, and continues on to terminate with a radially directed wall 40 that engages seal 20. The upper region 36 of seal case 19 includes an axially directed wall 41 and a radially directed wall 42 that are spaced away from the housing 31. Radially extending wall 42 includes an opening 43 that mounts a grommet 44. The grommet 44 surrounds and protects a pair of wire leads that are electrically coupled to the terminal ends of the coil 29 and exit the seal case 19.

Figure 2:
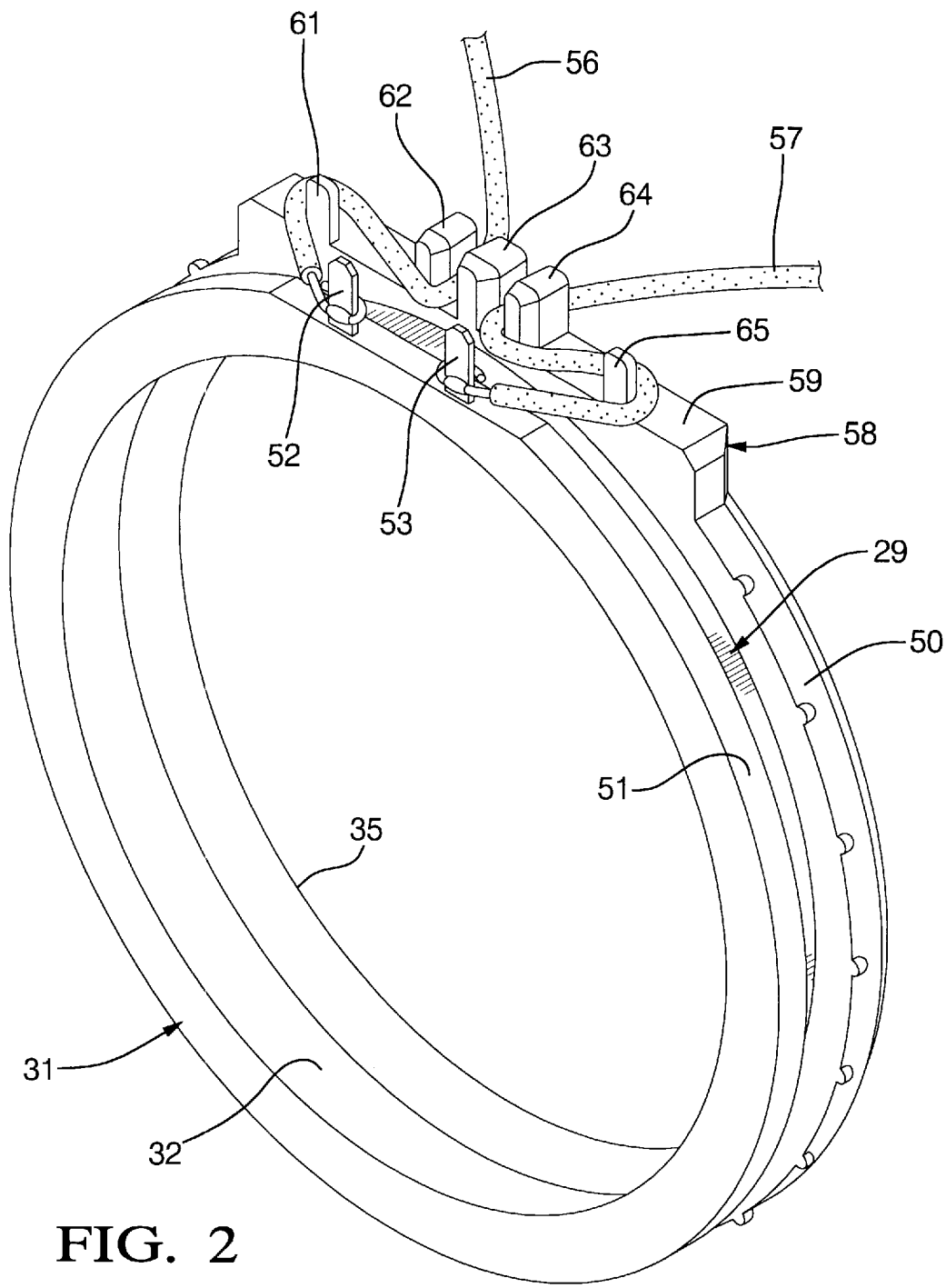
FIG. 2 is a detail perspective view of the speed sensor coil assembly of the wheel hub and bearing assembly illustrated in FIG. 1.

Referring to FIG. 2, the coil 29, and aspects of its termination are more clearly illustrated. The U-shaped wall 32 of housing 31 includes an inboard wall 50 and a spaced away generally parallel outboard wall 51. The outboard wall 51 carries a pair of electrically conductive terminals 52 and 53 that extend upwardly and are engaged in the material of the housing 31. The terminals are adapted to engage opposite ends of the wound coil 29 with electrical contact established therebetween. For example, the ends of the coil 29 may be soldered or similarly secured to the terminals 52 and 53 or the ends of the coil 29 may be inserted into openings in the outboard wall 51 that subsequently receive the terminals 52 and 53. When the housing 31 is assembled in the hub and bearing assembly 10 as shown in FIG. 1, the terminals are positioned in the upper region 36 of seal case 19 so as to be electrical isolated from all conductive components of the assembly other than the coil 29. For communicating information about induced currents in the coil 29, the terminals 52 and 53 are engaged by a pair of wire leads designated 56 and 57, respectively. The wire leads are preferably secured to the terminals 52 and 53 in a permanent manner such as through a soldering process, by crimping or welding, or through a variety of other known processes, and extend out of the seal case 19 through the grommet 44.

Since the hub and bearing assembly 10 will be traveling through space with the associated wheel assembly, the wire leads 56 and 57 will be subjected to various physical inputs including those from applied forces and torques. Accordingly, an aspect of the present invention is directed at accommodating those inputs in a manner that protects the connections between the wire leads 56 and 57 and the terminals 52 and 53, and between the coil 29 and the terminals 52 and 53, so that a durable and robust assembly is provided that continues to operate in a relatively harsh environment. Specifically, the housing 31 is itself designed to relieve the connections from stresses that would otherwise result from the inputs on the wire leads 56 and 57.

With reference to the inboard wall 50 of housing 31 as shown in FIG. 2, a securing surface generally in the form of block 58 is presented that extends upward from the inboard wall 50. Block 58 is generally shaped as a solid stand, preferably a rectangular block-shaped solid stand that has a thickness substantially equal to the thickness of the inboard wall 50 and is formed as part of the housing 31 during its molding process. As such, the lower side of the block 58 is semi circular at its mating edge with the inboard wall 50, and is in essence, an extension of the inboard wall 50 that provides a relatively flat surface 59. A pair of solid, cylindrical posts 61 and 65 extend from the block 58 at surface 59, and are preferably formed from the material of the housing 31 during molding. The posts 61 and 65 are spaced apart by a distance greater than that which separates the terminals 52 and 53. Centered between the posts 61 and 65 is a set of three solid, semi-cylindrical posts 62–64 that are oriented substantially in-line with the posts 61 and 65. The posts 62–64 are rounded on their outboard sides and are generally flat on their inboard sides and have a larger cross section than the posts 61 and 65. The flat inboard sides of the posts 62–64 lie against the wall 42 of seal case 19 as seen in FIG. 1.

The wire leads 56 and 57 are wrapped through the posts on the block 58 producing a stress relieving effect at the connections to the terminals 52 and 53. More specifically, the wire leads 56 and 57 each comprise a central conductor surrounded by insulating covering material. A segment at the terminal end of each wire lead 56 and 57 is stripped for connection to the respective terminal 52, 53. After connection to the terminal 52, the wire lead 56 is wrapped around post 61 in a relatively tight bend, preferably greater than 180 degrees, and is routed between the posts 62 and 63 from their outboard to inboard sides. Similarly, after connection to the terminal 53, the wire lead 57 is wrapped around post 65 in a relatively tight bend, preferably greater than 180 degrees, and is routed between the posts 63 and 64 from their outboard to inboard sides. This places the wire leads in a proper orientation for relatively direct routing through the grommet 44 and out from the seal case 19 as seen in FIG. 1.

Spacing between the posts 62,63 and 63,64 is set at approximately 70 percent of the wire insulation diameter on the wire leads 56 and 57 in the present embodiment. This has been found effective in protecting the connections at terminals 52 and 53 from external stresses. In general terms, the force provided by positioning the wire leads 56 and 57 into the spaces between the posts 62,63 and 63,64 respectively, is not intended to be autonomously sufficient for complete protection in all cases. Rather, the synergistic effect from a combination of the friction resulting in the spaces between the posts 62,63 and 63,64 and the resistance resulting from the bends provided around the posts 61 and 65 effects an optimal level of strain relief. It has been found that a combined maximum 70 percent spacing and a minimal 180 degree bend protect the terminals from stress to such an extent that the wire leads 56 and 57 will break at a point outside from the posts 62–64 before the impartation of any force at the terminals 52 and 53 occurs that is sufficient to cause a disconnect or wire failure in that area.

In operation, the variable reluctance ring 24 rotates in concert with the inner race 12 which is connected to the vehicle's rotating wheel. As the alternating teeth 26 and grooves 25 pass by any given point on the magnet 30, the lines of magnetic flux established thereby, pass through the air gap 33 at a time varying rate depending on the reluctance. When the air gap is defined between a tooth and the magnetic poles, the reluctance is relatively low and the flux is efficiently transferred. When the air gap is defined between a groove and the magnetic poles, the reluctance is relatively high and the flux is less efficiently transferred. The effects of the varying flux transfer result in a changing magnetic field in the space occupied by the stationary coil 29. This changing magnetic field generates currents in the coil 29 with a frequency proportional to the speed of rotation of the wheel. This information is communicated out from the protected environment inside the seal case 19 through the wire leads 56 and 57 to the wiring harness of the associated vehicle which is eventually routed through the vehicle body. The wire leads 56 and 57 are contained and the strain is relieved at some distance outside the seal case 19. Since the wheel is typically running over a variably uneven road surface, vibrations are transferred and relative movement occurs in the wire between the grommet 44 and the external strain relief, resulting in loads on the wire leads 56 and 57 from the exit at grommet 44. These loads are attenuated at the posts 61–65 to relieve the effect of strains at the terminals 52 and 53.

Thus it can be seen that the present invention provides stress relief at the wire lead-to-coil connection interface that advantageously protects the coil winding wire and the terminal connections.

What is claimed is:

1. A wire lead strain relief mechanism comprising:

a housing having a generally flat surface with at least three posts including a first post spaced away from a second post and a third post wherein the second and third posts are relatively close together, all three posts positioned substantially in a line;

an electrically conductive terminal engaged in the housing and spaced away from the line at a point in between the first and the second posts; and a wire lead having an insulating covering and being connected to the terminal wherein the wire lead extends from the terminal around the first post so that the wire lead is bent at least a 180 degree angle and then from the first post the wire lead passes in-between the second and the third posts, wherein the second and third posts are spaced apart a distance equal to no more than 70 percent of a distance across the insulating covering wherein the insulating covering is compressed between the second and third posts and wherein loads on the wire lead are attenuated at the first, second and third posts so that the terminal is relieved from stresses.

2. A wire lead strain relief mechanism for a coil comprising:

a housing having a first wall and a second wall located in substantially parallel and spaced apart positions, the first wall carrying at least one electrically conductive terminal and the second wall including a generally flat surface with at least three posts including a first post spaced away from a second post and a third post wherein the second and third posts are relatively close together, all three posts positioned substantially in line;

a wound coil carried in the housing between the first and second walls and having a terminal end engaging the terminal;

a wire lead having an insulating covering and being connected to the terminal wherein the wire lead extends from the terminal around the first post and then in-between the second and the third posts wherein the insulating covering is compressed between the second and third posts and wherein loads on the wire lead are attenuated at the first, second and third posts so that the terminal is relieved from stresses.

3. A wire lead strain relief mechanism according to claim 2 wherein the wire lead extends around the first post so that the wire lead is bent to at least a 180 degree angle and wherein the second and third posts are spaced apart a distance that is equal to no more than 70 percent of a distance measured across a diameter of the insulating covering.

4. A wire lead strain relief mechanism for a coil comprising;

a housing having a first wall and a second wall located in substantially parallel and spaced apart positions, the first wall carrying a pair of spaced apart electrically conductive terminals and the second wall including a generally flat surface with a pair of posts including a first post and a fifth post that are spaced apart a distance further than the terminals are spaced apart, and with a set of three posts including a second post, a third post, and a fourth post, all three positioned substantially in line with the first and fifth posts and substantially centered between the first and fifth posts;

a wound coil carried in the housing between the first and second walls and having a pair of terminal ends each engaging one of the terminals;

a first wire lead having an insulating covering that is stripped at an end that is connected to the first terminal wherein the first wire lead extends from the first terminal around the first post and then in-between the second and the third posts wherein the insulating covering is compressed between the second and the third posts and wherein loads on the first wire lead are attenuated at the first, second and third posts so that the first terminal is relieved from stresses; and a second wire lead having an insulating covering that is stripped at an end that is connected to the second terminal wherein the second wire lead extends from the second terminal around the fifth post and then in-between the third and the fourth posts wherein the insulating covering is compressed between the third and the fourth posts and wherein loads on the second wire lead are attenuated at the fifth, third and fourth posts so that the second terminal is relieved from stresses.

5. A wire lead strain relief mechanism according to claim 4 wherein the first and second wire leads extend around the first and fifth posts, respectively, so that the first and second wire leads are each bent to at least a 180 degree angle and wherein the second and third posts and the third and fourth posts are spaced apart a distance that is equal to no more than 70 percent of a distance measured across a diameter of the insulating covering on the first and second wire leads.

6. A wire lead strain relief mechanism for a coil of a wheel speed sensor comprising:

a rotatable ring including a perimeter with alternating teeth and grooves;

a magnet positioned generally radially around the rotatable ring in a nonrotatable position;

a coil positioned generally radially around the rotatable ring near the magnet in a nonrotatable position so that rotation of the rotatable ring near the magnet results in varying magnetic flux at the coil;

a housing having a first wall and a second wall located in substantially parallel and spaced apart positions, the first wall carrying a pair of spaced apart electrically conductive terminals that extend from the housing and the second wall including a generally flat surface with a pair of posts including a first post and a fifth post that are spaced apart a distance further than the terminals are spaced apart, and with a set of three posts including a second post, a third post, and a fourth post, all three positioned substantially in line with the first and fifth posts and substantially centered between the first and fifth posts, wherein the coil is carried in the housing between the first and second walls and has a pair of terminal ends each engaging one of the terminals;

a seal case positioned over the rotatable ring, the magnet and the coil, in a nonrotatable position;

a first wire lead having an insulating covering that is stripped at an end that is connected to the first terminal wherein the first wire lead extends from the first terminal around the first post and then in-between the second and the third posts, and through an opening in the seal case wherein the insulating covering is compressed between the second and the third posts and wherein loads placed on the first wire lead at a position outside the seal case are attenuated at the first, second and third posts so that the first terminal is relieved from stresses; and a second wire lead having an insulating covering that is stripped at an end that is connected to the second terminal wherein the second wire lead extends from the second terminal around the fifth post and then in-between the third and the fourth posts, and through the opening in the seal case wherein the insulating covering is compressed between the third and the fourth posts and wherein loads placed on the second wire lead at a position outside the seal case are attenuated at the fifth, third and fourth posts so that the second terminal is relieved from stresses.

7. A wire lead strain relief mechanism according to claim 6 wherein the first and second wire leads extend around the first and fifth posts respectively, so that the first and second wire leads are each bent to at least a 180 degree angle and wherein the second and third posts and the third and fourth posts are spaced apart a distance that is equal to no more than 70 percent of a distance measured across a diameter of the insulating covering on the first and second wire leads.

* * * * *